(12) United States Patent
Taskiran

(10) Patent No.: US 12,092,012 B2
(45) Date of Patent: Sep. 17, 2024

(54) PORTABLE EFFICIENT HEATER MANAGEMENT SYSTEM FOR DIESEL ENGINE GENERATORS THAT HEATS THE ENGINE BLOCK WATER ECONOMICALLY WITH THE HEAT OBTAINED FROM AN EXTERNAL HEAT SOURCE

(71) Applicant: PANOTEKNIK JENERATOR ELEKTRIK SANAYI VE TICARET LIMITED SIRKETI, Konya (TR)

(72) Inventor: Ismail Taskiran, Konya (TR)

(73) Assignee: PANOTEKNIK JENERATOR ELEKTRIK SANAYI VE TICARET LIMITED SIRKETI, Konya (TR)

( * ) Notice: Subject to any disclaimer, the term of this patent is extended or adjusted under 35 U.S.C. 154(b) by 0 days.

(21) Appl. No.: 18/276,452

(22) PCT Filed: Oct. 28, 2022

(86) PCT No.: PCT/TR2022/051209
§ 371 (c)(1),
(2) Date: Aug. 9, 2023

(87) PCT Pub. No.: WO2023/121613
PCT Pub. Date: Jun. 29, 2023

(65) Prior Publication Data
US 2024/0141822 A1 May 2, 2024

(51) Int. Cl.
*F01P 11/20* (2006.01)
(52) U.S. Cl.
CPC .......... *F01P 11/20* (2013.01); *F01P 2060/18* (2013.01)

(58) Field of Classification Search
CPC ............................ F01P 2060/18; F01P 11/20
See application file for complete search history.

(56) References Cited

U.S. PATENT DOCUMENTS

| | | | | |
|---|---|---|---|---|
| 5,048,753 A | * | 9/1991 | Kellie | B60H 1/00264 123/142.5 R |
| 5,941,204 A | * | 8/1999 | Randolph | F02N 19/10 237/12.3 B |
| 10,100,801 B2 | * | 10/2018 | King | B60L 1/02 |

FOREIGN PATENT DOCUMENTS

| | | |
|---|---|---|
| CN | 206016961 U | 3/2017 |
| CN | 107023429 A | 8/2017 |
| CN | 109854429 A | 6/2019 |
| CN | 111706453 A | 9/2020 |

* cited by examiner

*Primary Examiner* — Kevin A Lathers
(74) *Attorney, Agent, or Firm* — Bayramoglu Law Offices LLC

(57) ABSTRACT

A portable efficient heater management system includes an external heat source, a circulation pump that provides the circulation of the water taken from the external heat source, a heat sensor measuring the temperature of the water coming from the heat source, water transfer pipes, a two-section heat exchanger in which the waters in them do not mix with each other, but heat transfer can be made, a pressure gauge, a processor, a heat sensor placed on a generator, a generator circulation pump, a three-way valve. It also provides the engine blocks of diesel-powered generators to be heated with the heat obtained from an external heat source, as long as the heat in the external source is sufficient.

15 Claims, 1 Drawing Sheet

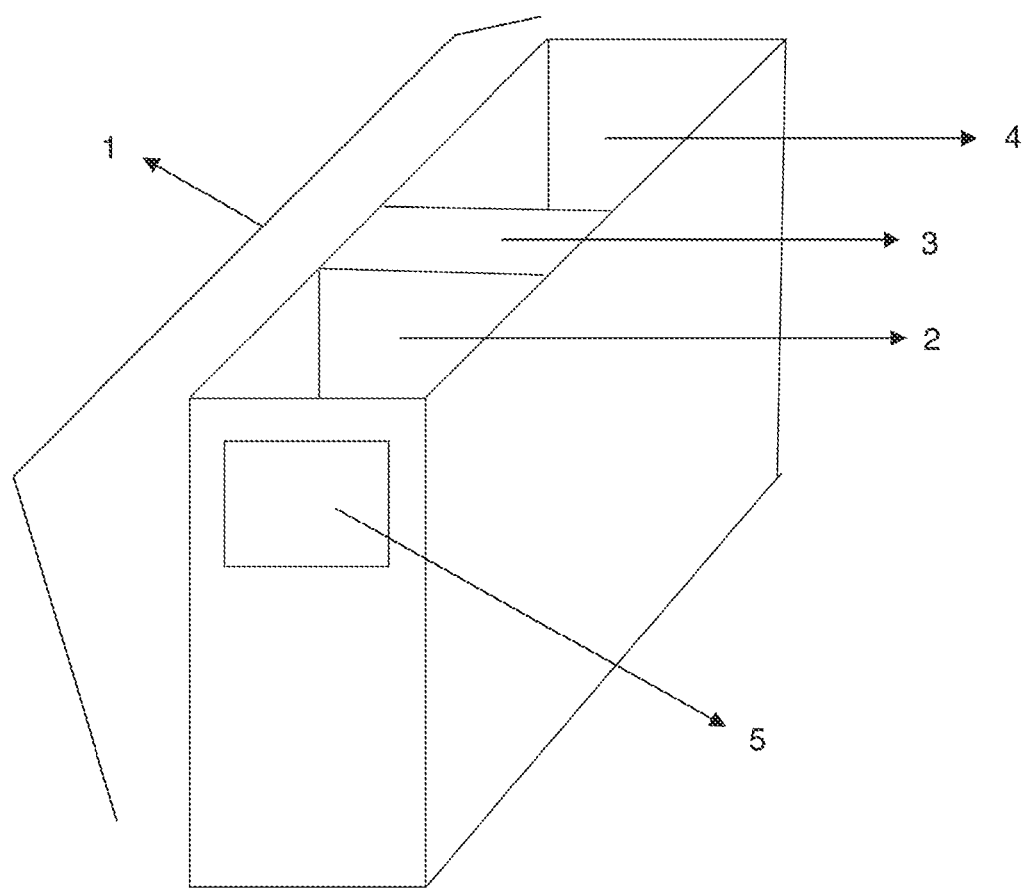

PORTABLE EFFICIENT HEATER MANAGEMENT SYSTEM FOR DIESEL ENGINE GENERATORS THAT HEATS THE ENGINE BLOCK WATER ECONOMICALLY WITH THE HEAT OBTAINED FROM AN EXTERNAL HEAT SOURCE

CROSS REFERENCE TO THE RELATED APPLICATIONS

This application is the national phase entry of International Application No. PCT/TR2022/051209, filed on Oct. 28, 2022, the entire contents of which are incorporated herein by reference.

TECHNICAL FIELD

The invention comprises an external heat source, a circulation pump that provides the circulation of the water taken from the external heat source, a heat sensor measuring the temperature of the water coming from the heat source, water transfer pipes, a two-section heat exchanger in which the waters in them do not mix with each other, but heat transfer can be made, a pressure gauge, a processor, a heat sensor placed on a generator, a generator circulation pump, a three-way valve. It also provides the engine blocks of diesel-powered generators to be heated with the heat obtained from an external heat source, as long as the heat in the external source is sufficient, without using the existing resistances, by consuming less electricity, reducing electricity consumption and reducing emissions on the basis of efficiency.

BACKGROUND

The ideal pre-start engine block water temperature should be 40° C. (Celsius) and above in today's diesel engine generator systems, which are also called emergency generator sets that are ready to be activated automatically in case of mains interruptions or are used mobile in the field, declared by the generator manufacturers in their maintenance and user manuals. In case of starting below this temperature, the first start of the generator engine becomes difficult. When the engine fails to start at the first attempt, the second or third attempts occur, and the time to generate and transmit the energy to the critical loads and the receivers that need to be energized is prolonged. In addition, engine wear increases, initial load capacity decreases, fuel consumption and exhaust gas emissions increase. The number of automatic starts recommended by generator manufacturers in the maintenance and operating manuals for generator sets with auto-starts, is three times in total, with a ten-second waiting time between the starts. Due to diesel engines that fail to take off at the end of the third starting attempt, the generator sets are disabled by alarming, causing the facility to be de-energized. Therefore, the engine block water circuit must be heated in order to operate the generator engines without being damaged and with the highest starting efficiency. In the prior art, this heating process is carried out with systems known as block heater containing resistance. In this system, the coolant circulating in the generator engine block is passed through the unit or units (block water heater) containing resistance in different electrical powers and numbers (1000 watts/3000 watts, etc.) that are selected depending on factors such as engine model, location, model and type of generator and the water is brought to the desired temperature. With the heated water, the generator engine block jacket water circuit is kept at the desired temperature. The liquid heated in the block heaters (This liquid can be water, water and ethylene glycol mixture cooling liquid, etc.) can cycle naturally, as well as with the help of an external circulation pump, it is cycled more homogeneously and quickly in the cooling system. Means, an external electrical energy is needed to heat the generator engine block and circulate the liquid. These resistors, which are fed from the mains energy, cause a high amount of electricity consumption and therefore increase the carbon emission by the amount of electricity they consume. In environments where there is no mains electricity (for example, concerts, events, festivals, testing, production, temporary accommodation, etc. facilities far from the city, in open land or mountainous regions), it is not possible to heat the generators, causing the above-mentioned problems and losses during operation. At this point, our invention offers a more economical system design based on portable efficiency, which enables the generator motors to be kept at the desired ideal temperature without the need for external electrical energy or by consuming less electricity.

BRIEF DESCRIPTION OF THE DRAWINGS

The FIGURE is view of the interior layout of the module subject to the invention
Equivalents of the numbers given in the FIGURE:
1. Module
2. Front Section
3. Insulator
4. Rear Section
5. Display

DETAILED DESCRIPTION OF THE EMBODIMENTS

The system subject to the invention has a structure that can be integrated into every generator, can be carried, and all its elements are comprised in a module (1). The purpose of the invention is to heat an engine block water circuit, which should be at the ideal temperature during the first operation of the generators, by starting a heat transfer between a hot water to be taken from an existing external heat source (The external heat source can be at least one of the following without any restriction purposes: boiler room boiler circuit hot water that is already existing and/or more cost-effectively heated, hot water heated from the sun using a solar collector, thermal spring water around the facility, obtaining hot water with natural gas consumption) with a water circulated in a generator engine and thus to prevent the consumption of an extra source for heating the cold water. This structure comprises an external heat and electricity source (For example, electricity is produced near by the generator with a solar panel and with this electricity, in order to meet the electrical needs in the block water heater system (battery charging circuit, heater resistance, heater circulation pump, optional oil/fuel/battery/alternator/engine oil pan heaters in the generator, lighting inside the generator, etc.), a circulation pump, a temperature sensor measuring the temperature of the water coming from the heat source, water transfer pipes, a two-section heat exchanger in which the waters do not mix with each other, but heat transfer can be made, pressure gauge, processor (heater efficiency system control unit) a temperature sensor on the generator, a generator circulation pump, and a three-way valve.

The module (1) comprising the system subject to the invention further comprising three sections. These sections are named as a front section (2) (Electrical and control section), an insulator (3) and a rear section (4) (Mechanical installation and equipment section). The front section (2) comprises the electrical and electronic devices in the system, the control unit further comprising the processor, the inputs of the control cables and a display (5). The insulator (3) has a structure that cuts the contact between the front section (2) and the rear section (4) and prevents the front section (2) from heat, water, humidity, vibration and electricity. The rear section (4) comprises the external heat source flow/return circuits, the heat exchanger section where the generator engine block water circuit will circulate, a temperature sensor measuring the temperature of the water coming from the external source and a pressure sensor and other mandatory mechanical devices for water circulation.

The display (5) is positioned on the front section (2), which provides the user with the opportunity to access the interface that allows the user to setup the software comprised in the microprocessor in the system. This display (5) can be a touch screen or comprises buttons. The user can make the settings detailed below and see the warnings/information by the system via this display (5). Apart from the display (5), there are electrical input ports (electrical-electronic devices) on the front section (2) that allow electrical energy to be supplied to the system. Thanks to these electrical inputs, it is possible to control the pumps and other electrical equipment within the system.

The insulator (3) is placed between the front section (2) and the rear section (4). The purpose of the insulator (3) is to prevent the contact between the water loop units in the rear section (4) and the electrical loop units located in the front section (2). For this reason, the insulator (3) is at least one of the epoxy, silicone, fiber, rubber, glass wool, rock wool, insulating carpet, heat plate materials or their equivalents. This material is fixed and covered with silicone and membrane material by being in full contact with each of the cabinet walls to insulate the front section (2) and the rear section (4) from each other and to prevent passage from these contact points.

As explained above, the system that provides heating of the water, which is circulated in the generator with the hot water taken from the external heat source, comprises a heat exchanger. If the invention is to be used in a system where more than one generator is used, the heater management system which is subject to this invention will be used as much as the number of generators in the system. The heat exchangers within the mentioned efficient heater management system are suitable for the generator cooling liquid capacity. In other words, each heat exchanger is suitable for the heat transfer area and capacity that can take the water that needs to circulate in the generator and meet the heating time and heating power. There are primary inlet, primary output, secondary inlet and secondary output circuits on the heat exchanger. The water pipeline carrying hot water from the above-mentioned heat source is connected to the primary inlet circuits of the heat exchanger. On the primary inlet, there is a temperature sensor and a pressure sensor that measures the temperature of the water coming from the external heat source.

There is a circulation pump on the water pipeline carrying hot water from the heat source connected to the primary inlet of the heat exchanger. Hot water taken from the outlet of the circulation pump and from the heat source is conveyed to the system which is subject to the invention connected to the generators by means of pipes. If the outlet pressure of the external heat source is sufficient, there is no need to use a pump. This pressure sufficiency is monitored by the above mentioned pressure sensor located at the inlet of the heat exchanger. In case the data read by the pressure sensor is below the pressure amount defined by the user on the above-mentioned display (5), the circulation pump on the external heat source side is activated, if the circulation pumps are already activated their speed is increased. If the data read by the sensor is above the predefined pressure amount, the circulation pump on the external heat source side is not activated.

It has been explained in detail above that the main purpose of the system subject to the invention is to bring the diesel engine temperature in the generator to the desired level in an efficient and economical way by consuming less electrical energy. At this point, it is also an object to stop the system when it fulfills the relevant purpose. The temperature sensor on the generator is used for this process. When the information that the generator has reached the desired temperature level is obtained from the temperature sensor on the generator through the processor, the circulation pump on the external heat source side and the circulation pump on the generator side are stopped. This stopping process is carried out by closing the relays connected to the pumps by the processor. Thus, hot water is not carried to the system subject to the invention and the water circulation in the diesel engine block is stopped.

The efficient heater management system, which is the subject of the invention, comprises a liquid leakage sensor. This liquid leakage sensor is placed in a small pool formed in the rear part (4). Since the rear section (4) comprises liquid inlet and outlet installations and potential leaks will be in this section, such a layout has been preferred. Said pool is large enough to cover the bottom of the liquid installations. In case of a possible leakage, the height of the liquid filled into the pool is measured by the liquid leakage sensor and if it exceeds the specified height, it gives a visual and audible warning to the user via the display (5).

The system is bridged with the three-way valve on the generator side before the heat exchanger, upon the possible water leakage information coming from the liquid leakage sensor or with the command to be given via the interface on the display (5) when the user wants to disable the system, and the jacket water heater circuit (which provides the loop in the generator) is restored. In this case, the primary water circulation in the heat exchanger circuit is stopped, the resistance and generator side circulation pump outputs in the old system are activated, and the continuity of the target engine temperature over the old system is ensured.

As described above, there is a speaker within the module to give the sound warning.

The efficient heater management system, which comprises a processor, is suitable for remote communication and the module (1) comprises wired and wireless communication protocols for this purpose. The wireless communication protocol can be, but not limited to, wifi, bluetooth, rfid and nfc. Wired communication protocols can be at least one of the RS 232, RS 485, modbus, canbus modules, but not limited to these. Users can see/change the necessary status information and setting parameters via the control unit display (5), as well as via SCADA systems or PC communication to provide the above interventions and controls.

With the temperature information read from the heat sensor in the generator engine, it is determined that the engine temperature has reached the lower limit, and the pump on the external heat source (in the configurations where a pump will be used) is commanded to run through the processor. With the operation of the pump, the data of the hot water coming from the external heat source are read through the pressure and temperature sensors at the primary inlet of the heat exchanger. In case the temperature of the incoming water read by the temperature sensor is below the temperature amount defined by the software in the processor via the above-mentioned display (5), the generator circulation pump is not operated. Thus, the water in the generator engine block is not circulated and it is not in heat transfer with the water coming from the external heat source. If the temperature of the water coming from the external heat source, read by the temperature sensor, is above the temperature that the user has defined in the software on the processor via the above-mentioned display (5), the generator circulation pump is activated by the processor and the water in the generator engine block is circulated through the heat exchanger, and heat transfer is started. Thus, the liquid in the diesel engine block, which is aimed to be heated with the liquid in the external source circuit at the desired temperature, is heated by heat transfer.

It has been explained above that the generator circulation pump is not started when the data of the temperature of the incoming water read by the temperature sensor is below the temperature amount that the user has defined to the software in the processor via the above-mentioned display (5). At this point, a waiting time is set by the user according to the distance of the external heat source to the system which is the subject of the invention. This adjustment is also done via the display (5). During this waiting time, whether the water reaches the desired temperature is also monitored by the temperature sensor. If the water does not reach the desired temperature value at the end of the waiting time, the system subject to the invention is deactivated by the processor, and the generator, if available, returns to the old system mentioned in the previous technical part. This process is a kind of bypass operation. The aim here is to heat the generator as a final solution, if there is an electricity supply, with old-fashioned systems and to avoid problems.

There is an anti-freeze mode in the software in the processor of the system which is the subject of the invention. It was stated above that the temperature of the water coming from the external water source is measured and if this water temperature is not at the desired level, it is disabled. However, for environments where very cold climates are experienced, it is important to circulate the water in the pipes. Otherwise, the water freezes in the pipes and explosions may occur. Or the systems cannot run due to freezing. In order to prevent this, the anti-freeze mode, which ensures that the water is in continuous circulation in the pipes, regardless of the temperature of the circulating water, is designed in the software. With the activation of this mode, when the temperature of the liquid coming from the external heat source to the heat exchanger approaches freezing (it can be adjusted on the processor), the external heat source circulation pump is activated and the water is ensured to circulate continuously. This prevents the water from freezing. And this mode can be started and terminated by the user via the display (5).

The heat exchanger secondary circuit takes the jacket water from the jacket circuit in the generator engine block (which provides the loop in the generator) and gives it back. Thus, heat transfer is made with the primary circuit in which the water coming from the external heat source is circulated. But the waters circulating in the heat exchanger never mix with each other. So, there is no connection between them.

The block heater's direct connection used in the previous art is disconnected from the radiator in the system subject to the invention and the heat exchanger secondary output circuit is connected to the inlet of the block heater. Means, the heat exchanger subject to the invention is connected between the radiator return circuit and the block heater inlet circuit which are used in the standard systems. In the original structure of the generator, if there is a circulation pump in the block heater circuit, the pump feed is canceled from its current circuit and transferred to the system subject to the invention. If there is no circulation pump in the block heater circuit in the original structure of the generator, a circulation pump is added to the heat exchanger secondary circuit input of the invention and power supply is provided within the system. Means, the circulation pump, which will ensure the circulation of the water in the generator, is used if it is present in the existing block heater system, if not it is used by adding it to the system.

It has been stated above that there will be as many heat exchangers as there are generators. In such a scenario, the water that completes its cycle inside the heat exchangers is given out from the primary outlet circuit of the heat exchangers. The primary output circuits of all heat exchangers in the system are combined. Thus, the water, which completes its cycle in all heat exchangers, leaves the primary outlet circuits and is transported back to the cold water inlet circuit of the external heat source through pipes with a single pipeline.

Again, in a scenario where there is a multiple heat exchanger, the water is taken from the external heat source and transported to the heat exchangers with an electric circulation pump. There is a communication between the circulation pump and the microprocessor. This communication is provided by relays. There are as many relays as the number of generators to be included in the system. Thus, each relay monitors the information from each generator. Each generator has a heat sensor that measures the generator engine temperature and sends information to the software within the processor in the system. According to the incoming heat information, when a measurement below the required temperature in a generator is detected, it enables the circulation pump connected to the external water source to operate. With the operation of the circulation pump, hot water enters from the primary inlet of all heat exchangers. However, since only the circulation pump of the generator that needs hot water will work, heat transfer will be provided to the engine block of the generator that needs hot water through its own heat exchanger. This system works similarly in case of hot water demand from more than one generator. When the circulation pumps of the demanding generators start to transfer heat from the secondary circuit of its own exchanger and heat transfer is carried out in all the generators that need it.

The general working principle of the system is summarized below:

Temperature information is read from the heat sensor connected to the generator, The system starts to operate according to the defined generator temperature lower temperature level information, When the generator temperature comes to the lowest level, the primary circulation of the heat exchanger is started with the circulation pump at the outlet of the external heat source (if there is enough pressure, pressurized hot water will be available at the primary inlet), Waiting for a while according to the distance of the incoming water line, At the end of the time, if a temperature above the generator lower temperature level defined above is read on the temperature sensor located at the primary inlet of the heat exchanger, the circulation pump in the secondary circuit is started and the heat transfer between the two sources is started with the heat exchangers, If the primary inlet temperature does not exceed the lower limit of the generator at the end of the waiting time, the heat exchanger primary circulation pump is turned off, it is understood that there is not enough hot water from the external heat source and a warning is given to the user on the display (5), The block heater is activated and the block heater resistors are operated. The circulation pump in the secondary circuit is started. Generator water is heated with a resistance as in the old system, and it is continued until the upper limit is reached. When it reaches the upper limit, the resistance is turned off, the circulation pump in the secondary circuit is turned off and the generator starts to cool naturally. When the heat level in the engine block reaches the lower limit again, the heat exchanger system is primarily restarted in order to ensure that the above-mentioned scenario is efficient and economical.

When the generator temperature reaches the upper level, both circulation pumps are turned off and heat transfer is terminated.

The generator starts to cool naturally and when the heat level reaches the lower limit again, the cycle is started again.

What is claimed is:

1. A portable efficient heater management system heating an engine block water with a heat obtained from an external heat source comprising:
a module including a front section, an insulator, and a rear section, wherein the front section comprises electrical and electronic devices in the portable efficient heater management system, a control unit further comprising a processor, inputs of control cables and a display, wherein the display gives a visual/audible warning, wherein the insulator has structure, wherein the structure cuts a contact between the front section and the rear section and insulates the front section from heat, water, humidity, vibration and electricity, and wherein the rear section comprises flow/return circuits, a heat exchanger, sensors and other mechanical devices for a water circulation, a temperature sensor measuring a temperature of the water coming from the external heat source and a pressure sensor;
a temperature sensor on a generator; and
a generator circulation pump.

2. The portable efficient heater management system according to claim 1 comprising a microprocessor further comprising a software providing a user an opportunity to access an interface, wherein the interface allows the user to setup the software via the display.

3. The portable efficient heater management system according to claim 2 comprising a three-way valve on a generator side before the heat exchanger disabling the portable efficient heater management system with a command given via the interface on the display by the user.

4. The portable efficient heater management system according to claim 1, wherein the insulator is made of at least one selected from the group consisting of epoxy, silicone, fiber, rubber, glass wool, rock wool, insulating carpet, and heat plate materials.

5. The portable efficient heater management system according to claim 1, wherein the heat exchanger comprises a primary inlet, a primary output, a secondary inlet and a secondary output circuit.

6. The portable efficient heater management system according to claim 5, wherein the primary inlet circuit of the heat exchanger comprises a circulation pump.

7. The portable efficient heater management system according to claim 6, wherein the circulation pump on the primary inlet circuit of the heat exchanger comprises a relay providing a communication between the circulation pump and the microprocessor.

8. The portable efficient heater management system according to claim 1 comprising the processor activating a pressure pump on an external heat source side if a pressure sufficiency monitored by the pressure sensor is below a pressure amount defined by the user on the display and increasing a speed of the circulation pump if the circulation pumps are already activated.

9. The portable efficient heater management system according to claim 1 comprising a microprocessor stopping the circulation pump on an external heat source side and the circulation pump on a generator side by closing relays when information is obtained from a heat sensor on the generator that the generator has reached a desired temperature level.

10. The portable efficient heater management system according to claim 1 comprising the rear section further comprising a liquid leakage sensor and a pool, wherein the pool is large enough to cover a bottom of liquid installations where a leakage liquid is allowed to fill in case of a possible leakage.

11. The portable efficient heater management system according to claim 1 comprising a module further comprising wired and wireless communication protocols.

12. The portable efficient heater management system according to claim 1 comprising the processor running the circulation pump on the external heat source if temperature information read from a heat sensor in a generator engine shows that an engine temperature has reached a lower limit.

13. The portable efficient heater management system according to claim 1 comprising a microprocessor starting a heat transfer if the temperature of the water coming from the external heat source, read by the temperature sensor, is above a temperature that the user has defined in a software on the processor via the display by activating the circulation pump and circulating the water in a generator engine block through the heat exchanger.

14. The portable efficient heater management system according to claim 13 comprising a microprocessor monitoring whether the water reaches a desired temperature during a waiting period set by the user, by means of the temperature sensor, disabling the portable efficient heater management system if the water does not reach the desired temperature value at an end of the waiting period.

15. The portable efficient heater management system according to claim 1 comprising the processor further comprising a software with an anti-free mode ensuring that the water is in continuous circulation in pipes, regardless of the temperature of the circulating water by activating the external heat source circulation pump.

* * * * *